US011341217B1

(12) United States Patent
Corral

(10) Patent No.: US 11,341,217 B1
(45) Date of Patent: May 24, 2022

(54) ENHANCING OBFUSCATION OF DIGITAL CONTENT THROUGH USE OF LINEAR ERROR CORRECTION CODES

(71) Applicant: National Technology & Engineering Solutions of Sandia, LLC, Albuquerque, NM (US)

(72) Inventor: Celestino A. Corral, Milpitas, CA (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 0 days.

(21) Appl. No.: 17/090,304

(22) Filed: Nov. 5, 2020

(51) Int. Cl.
  *G06F 21/14* (2013.01)
  *H03M 13/09* (2006.01)
  *H03M 13/15* (2006.01)

(52) U.S. Cl.
  CPC .......... *G06F 21/14* (2013.01); *H03M 13/091* (2013.01); *H03M 13/15* (2013.01)

(58) Field of Classification Search
  CPC ...... G06F 21/14; H03M 13/091; H03M 13/15
  See application file for complete search history.

(56) References Cited

U.S. PATENT DOCUMENTS

| 5,835,602 | A | 11/1998 | Lang | |
|---|---|---|---|---|
| 2009/0138715 | A1* | 5/2009 | Xiao | H04L 9/0838 713/171 |
| 2020/0151356 | A1* | 5/2020 | Rohloff | G06F 21/6227 |
| 2020/0204354 | A1* | 6/2020 | Cuellar | H04L 9/0662 |

OTHER PUBLICATIONS

Baicheva, et al., "CRC Codes for Error Control", In Mathematika Balkanica, vol. 21, 2007, pp. 377-387.
"The Euler Phi Function", Retrieved from: https://www.whitman.edu/mathematics/higher_math_online/section03.08.html. Retrieved Date: Oct. 21, 2020, 5 Pages.
Ferguson, et al., "Self-Synchronous Scramblers for PPP Over Sonet/SDH: Some Analysis", Retrieved from: https://tools.ietf.org/html/draft-ferguson-pppsonet-selfsync-00, Retrieved Date: Oct. 21, 2020, 21 Pages.
Kan, et al., "Enhancing Embedded SRAM Security and Error Tolerance with Hardware CRC and Obfuscation", In International Symposium Defect and Fault Tolerance in VLSI and Nanotechnology Systems (DFTS), 2015, pp. 119-122.
Kumar, et al., "Faster Algorithms for Binary Matrix Factorization", In Proceedings of the 36th International Conference on Machine Learning, 2019, 9 Pages.
Prieto, et al., "Study of Undetected Error Probability of IEEE 802.3 CRC-32 code for MTTFPA analysis", In IEEE 802.3bv Task Force, Jan. 2015, 13 Pages.

(Continued)

*Primary Examiner* — Thien Nguyen
(74) *Attorney, Agent, or Firm* — Medley, Behrens & Lewis, LLC; Madelynne J. Farber

(57) ABSTRACT

Technologies related to enhancing security of digital content are described. Linear error correction codes (LECCs) are employed for dual purposes: 1) to obfuscate digital content; and 2) to verify integrity of the digital content. A transmitter computing system obfuscates digital content based upon an obfuscation protocol, wherein the obfuscated digital content includes an LECC. A receiver computing system deobfuscates the digital content by performing the inverse of the obfuscation protocol.

20 Claims, 7 Drawing Sheets

(56) References Cited

OTHER PUBLICATIONS

Ramabadran, et al., "A Tutorial on CRC Computations", In IEEE Micro, vol. 8, 1988, pp. 62-75.
Retrieved from: http://www-users.math.umn.edu/~garrett/coding/Overheads/09_fastmod_prim.pdf, Retrieved Date: Oct. 21, 2020, 15 Pages.
"Reverse-Engineering a CRC Algorithm", Retrieved from: http://www.cosc.canterburty.ac.nz/greg.ewing/essays/CRC-Reverse-Engineering.html, Retrieved Date: Oct. 21, 2020, 9 Pages.
"Scramblers, Error Multiplication, and Error Detection (Re: CRC check indication of bad fiber)", Retrieved from: http://www.ieee802.org/3/10G_study/email/msg00146.html, Retrieved Date: Oct. 21, 2020, 3 Pages.
Wacker et al., "Binomial and Monotonic Behavior of the Probability of Undetected Error and the 2-r -Bound", In WSEAS Transactions on Communications, vol. 7, Mar. 2008, pp. 188-197.
Weisstein, E. W., "Primitive Polynomial", Retrieved from: http://mathworld.wolfram.com/Primitive-Polynomial.html, Retrieved Date: Oct. 21, 2020, 2 Pages.
Winget, et al., "Security Flaws in 802.11 Data Link Protocols", In Communications of the ACM, vol. 46, May 2003, pp. 35-39.

* cited by examiner

ENHANCING OBFUSCATION OF DIGITAL CONTENT THROUGH USE OF LINEAR ERROR CORRECTION CODES

STATEMENT OF GOVERNMENTAL INTEREST

This invention was made with Government support under Contract No. DE-NA0003525 awarded by the United States Department of Energy/National Nuclear Security Administration. The U.S. Government has certain rights in the invention.

BACKGROUND

The nature of digital content in the form of media, software, messages, etc., makes such digital content susceptible to exploitation by third parties. Attacks on digital content can be employed to access, copy, modify, or destroy proprietary, sensitive, or vital information, with results of an attack ranging from interruption of business processes to extortion. Hence, it is desired to prevent unauthorized use of digital content and to conceal such digital content from reverse engineering.

Oftentimes, and conventionally, encryption is used to secure digital content. When encryption is employed to secure digital content, the digital content to be encrypted is modified through use of a cipher to generate ciphertext, wherein the ciphertext can be restored to its original form if decrypted by an authorized entity. "Strong" cryptography may be loosely interpreted as meaning that a key used to construct the cipher is "more difficult to guess." There is, however, no continuum between weak and strong cryptography, as many factors must be considered. Such factors include the cryptography scheme employed to encrypt data, length of a key employed to encrypt the data, difficulty in guessing the key used to encrypt the data, and so forth.

Despite advancements in cryptography, using cryptography alone to secure digital content may unintentionally expose the digital content to an attacker who is willing to employ a significant amount of computing resources to guess cryptographic keys. Thus, there is a continuing need to enhance security of digital content.

SUMMARY

The following is a brief summary of subject matter that is described in greater detail herein. This summary is not intended to be limiting as to the scope of the claims.

Described herein are various technologies pertaining to enhancing security of digital content through use of linear error correction codes (LECCs), such as cyclical redundancy check (CRC) checksums. There are various approaches that can be employed in connection with enhancing security of digital content through use of LECCs. In a first example, the LECC is a CRC checksum, and several CRC checksums can be generated for different blocks of the digital content, wherein the several checksums are generated through use of different generator polynomials. Accordingly, when a receiver computing system receives the digital content with the checksums included therein or appended thereto, the receiver computing system is unable to validate the digital content unless the receiver computing system has knowledge of the different generator polynomials employed in connection with generating the different checksums. This exemplary embodiment can be perceived as CRC code hopping through the digital content, analogous to frequency hopping in the spectrum of a signal.

In another example, a LECC generated for digital content can be injected into the digital content (and not appended thereto), wherein the receiver computing system must have knowledge of the location of the LECC in the digital content to enable the receiver computing system to process the digital content and validate the digital content based upon the LECC.

In still yet another example, the digital content can be partitioned into several blocks of data (which may optionally be of different lengths), and LECCs can be generated for respective blocks of data. At least one of: 1) order of the blocks of data; or 2) order of the LECCs can be randomized, such that the receiver computing system is unable to process the digital content or validate the digital content unless the receiver computing system is able to reorder the blocks of data and/or the LECCs to reconstruct the digital content (and separate the LECCs from the digital content). These two exemplary embodiments encompass an analog to spreading of data, where LECCs and blocks are spread throughout the digital content.

In still yet another exemplary embodiment, extraneous data can be inserted into the digital content and/or bits in the digital content can be altered, wherein the extraneous data and/or the alteration of the bits do not have an impact on the value of an LECC generated based upon the digital content. Put differently, the extraneous data and/or bit alterations can be identified, and the digital content can be altered to include the extraneous data and/or bit alterations (altered digital content), wherein a first LECC generated based upon the digital content is equivalent to a second LECC generated based upon the altered digital content when both LECCs are generated using the same generator polynomial. Therefore, when the receiver computing system receives the altered digital content, if the receiver computing system is a malicious actor, such malicious actor will validate the digital content by reproducing the second LECC; however, the malicious actor has validated the altered digital content (rather than the digital content), and the malicious actor will be unable to process the altered digital content. To be able to reconstruct the digital content and validate the integrity of the digital content, the receiver computing system must understand or have knowledge of where the extraneous data was added or bits of the digital content were altered.

The approaches described herein exhibit advantages over conventional approaches for enhancing security of digital content. First, the technologies described herein leverage LECCs to enhance the security of the digital content while also employing the LECCs for their intended purpose (to validate integrity of the digital content). In addition, approaches referenced above can be combined to further enhance security of digital content that is to be transmitted from a transmitter computing system to a receiver computing system.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
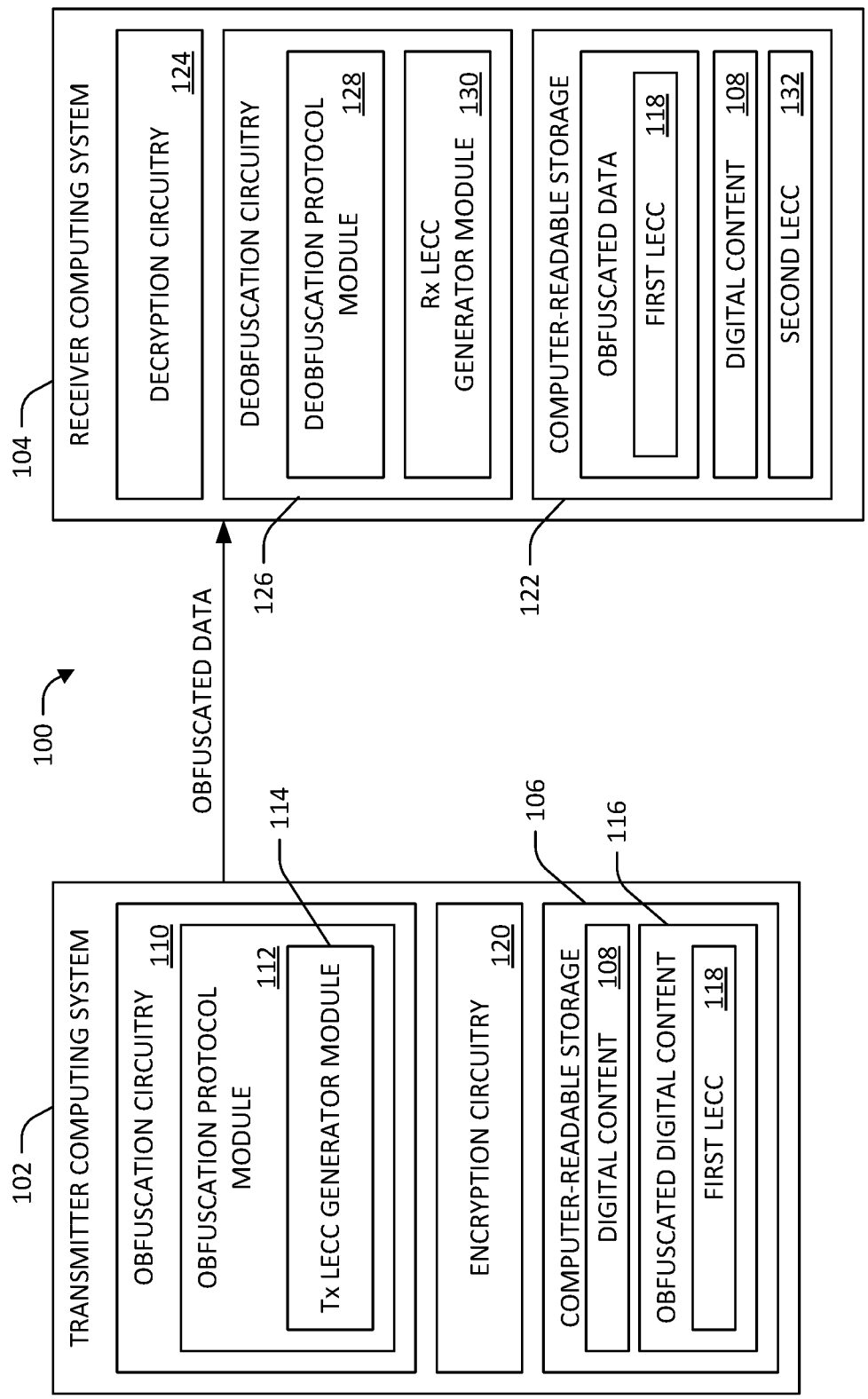
FIG. 1 is a functional block diagram of an exemplary computing system that is configured to enhance security of digital content through use of a linear error correction code (LECC).

Various technologies pertaining to enhancing security of digital content through use of linear error correction codes (LECCs) are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component", "module", and "system" are intended to encompass computer-readable data storage that is configured with computer-executable instructions that cause certain functionality to be performed when executed by a processor. The computer-executable instructions may include a routine, a function, or the like. It is also to be understood that a component, module, or system may be localized on a single device or distributed across several devices. Additionally, as used herein, the term "exemplary" is intended to mean serving as an illustration or example of something and is not intended to indicate a preference.

Described herein are various technologies pertaining to the enhancement of security of digital content that is to be transmitted from a transmitter computing system to a receiver computing system through use of LECCs, such as cyclical redundancy check (CRC) checksums. LECCs are ubiquitous in data transmission and are employed to ensure integrity of transmitted digital content. Briefly, for digital content that is to be transmitted from a transmitter computing system to a receiver computing system, the transmitter computing system computes a first LECC based upon the digital content and a generator function and appends the first LECC to the digital content (or includes the first LECC in a header packet for the digital content). When the digital content is received by the receiver computing system, the receiver computing system computes a second LECC based upon the digital content and the same generator function. The receiver computing system then compares the first LECC (computed by the transmitter computing system) with the second LECC (computed by the receiver computing system). When the first LECC and the second LECC are equivalent, the receiver computing system presumes that the received digital content is unaltered (i.e., that bits were not lost during transmission or altered during transmission, etc.). Contrarily, when the first LECC and the second LECC are not equivalent, the receiver computing system can perform some corrective action, such as requesting that the transmitter computing system resend the digital content. In other embodiments, the receiver computing system divides the digital content with the first LECC appended thereto by the generator function; when the remainder is 0, the receiver computing system presumes that the digital content is free of errors.

The technologies described herein employ LECCs for their original purpose (to ensure integrity of digital content). The technologies described herein additionally employ LECCs to obfuscate digital content. Various approaches are set forth herein that employ LECCs to obfuscate digital content that is transmitted from a transmitter computing system to a receiver computing system. In any of these approaches, an obfuscation protocol is a shared secret between the transmitter computing system and the receiver computing system. In an example, the transmitter computing system can compute a first LECC for digital content and can insert the first LECC into the digital content at some (potentially random) position within the digital content (rather than append the first LECC to the digital content or include the first LECC in a header packet for the digital content). The transmitter computing system transmits the digital content with the LECC incorporated therein. The receiver computing system has knowledge of the location within the digital content where the first LECC has been positioned. Thus, the receiver computing system can extract the first LECC from the digital content, can compute a second LECC for the digital content, and can compare the first LECC with the second LECC. If the two LECCs are equivalent, the receiver computing system has validated the integrity of the digital content. Alternatively, the receiver computing system can extract the first LECC from the digital content, append the first LECC to the end of the digital content, and divide the combination of the digital content and the first LECC by the generator function employed to create the first LECC. When the remainder is 0, the receiver computing system has validated the integrity of the digital content. A malicious entity that intercepts the digital content with the first LECC incorporated therein, however, will not have knowledge of the position within the digital content where the first LECC was inserted by the transmitter computing system. Accordingly, when the malicious entity tries to utilize the intercepted (obfuscated) digital content, unless the malicious entity is able to ascertain the position of the first LECC within the obfuscated digital content, the malicious entity will be unable to employ the digital content for a malicious purpose. There are numerous other examples where LECCs can be employed to obfuscate data that will be described in greater detail herein.

As noted above, an exemplary LECC is a CRC checksum. For purposes of explanation, additional detail pertaining to CRC is set forth below, and CRC is referenced in examples set forth herein. It is to be understood, however, that aspects described herein are not limited to CRC checksums, but rather any LECCs can be employed unless otherwise explicitly noted.

CRC is an error detecting scheme that is used to detect accidental changes to digital content. In operation, a transmitter computing system computes a short check value (a checksum) based upon the digital content, where the checksum is the remainder of a polynomial division of the digital content by a generator polynomial. The checksum is then appended to the digital content. As described previously, when the digital content is transmitted by the transmitter computing system to a receiver computing system, the receiver computing system extracts the checksum from the digital content and employs the same operation on the digital content to generate a second checksum. In the event that the checksum computed at the receiver computing system does not match the checksum that was included with the digital content (computed by the transmitter computing system), the digital content received at the receiver computing system likely contains errors and corrective action must be taken by the receiver computing system. Alternatively, the receiver computing system can divide the combination of the digital content and the checksum by the generator polynomial; when the remainder is 0, the receiver computing system validates integrity of the digital content.

The process is now described mathematically, as features set forth herein employ the notations set forth below. Specifically, $i(x)=i_0+i_1x+i_2x^2+\ldots+i_{k-1}x^{k-1}$ is the digital content of length k with any value $i \in \{0,1\}$. A generator polynomial of degree q can be selected as follows:

$$g(x)=1+a_1x+a_2x^2+\ldots+a_qx^q, \quad (1)$$

where $a_i \in \{0,1\}$. When the polynomial division is performed on the digital content, the following remainder is obtained:

$$r(x)=(x^m i(x)) \bmod(g(x))=r_0+r_1x+r_2x^2+\ldots+r_{q-1}x^{q-1} \quad (2)$$

where $r_i \in \{0, 1\}$ and $x^m$ means bit shift of m positions with the modulo-2 division implemented using the exclusive-or (XOR) operation.

The digital content transmitted comprises the codeword $c=[i, r]$ having $n=k+q$ bits. The checksum r is the redundancy added to the digital content for the error detection process. The process described by Eq. (2) is a sliding of the generator polynomial across the digital content (the bits of the digital content), obtaining a running remainder using the XOR operation at each shift. At the end of the k data bits, the final remainder is compared to the checksum r of the codeword to determine if an error occurred.

The process of generating a CRC checksum has many desirable error detection properties: 1) if g(x) has at least two nonzero terms $x^q$ and 1, then no codeword can be equal to $x^z$. Thus, g(x) can detect any single error of the form $e(x)=x^z$; 2) if g(x) has at least three nonzero terms, g(x) can detect double errors of the form $e(x)=x^y+x^z=x^y(1+x^{z-y})$ for some y with $z>y$; 3) if $g(x)=(x+1)h(x)$, that is, $(x+1)$ is a factor of g(x), then g(x) can detect all odd number of errors; 4) if $g(x)=(x+1)h(x)$ and h(x) is a primitive polynomial, then g(x) can detect any double errors up to content length $2^{q-1}-(q-1)$. These polynomials are of particular interest with respect to various features described herein; 5) a CRC checksum with generator polynomial of degree q can detect: a) any single burst error of length $\leq q$; b) all burst errors of length $q+1$ with probability $1-\frac{1}{2}^{q-1}$; and c) all burst errors of length greater than $q+1$ with probability $1-\frac{1}{2}^q$.

If it is assumed that the digital content is to be transmitted over a memoryless binary symmetric channel where bit errors can occur with some probability p, and it is further assumed that the errors occur uniformly randomly with probability $p=0.5$, then if $2^n$ codewords are equally likely, $2^k-1$ will be accepted as valid code words although they are different from the actual codeword. The probability of an undetected error denoted as $P_{ue}$ is described by the following relation:

$$P_{ue} = \frac{2^k - 1}{2^n} = 2^{k-2} - 2^{-n} \approx 2^{-(n-k)}. \quad (3)$$

Since $n-k=q$, a way to decrease the probability of undetected error is to increase the CRC checksum length.

It may be desirable that a code have a monotonic increasing probability of undetected error as p increases. A proper CRC checksum C is one in which the following holds:

$$P_{ue}(C,p) \leq P_{ue}(C,0.5) \text{ for } 0 \leq p \leq 0.5. \quad (4)$$

Not all CRC checksums are proper, so they do not necessarily meet the $2^{-(n-k)}$ bound. Unfortunately, there is no mathematical construct that can determine whether a CRC checksum is proper; that the error detection performs asymptomatically according to Eq. (4) can only be determined by testing the CRC checksum against increasing probabilities p.

An upper bound for the probability of undetected error of an arbitrary linear code C with error rate $0<\epsilon \leq 1$ is as follows:

$$P_{ue}(C, \epsilon) \leq \frac{\epsilon^d n^d}{d!}, \quad (5)$$

where d is the Hamming distance (HD) of the code. The HD is the number of positions by which two strings of equal length are different. In relation to error detection, a linear code C having an HD of d can detect up to d−1 errors.

The usefulness of the relation in Eq. (5) is that by setting some level of probability of undetected error to a value of σ, then the required content length n is determined from $$n = \frac{1}{\epsilon}(\sigma d!)^{1/d} \quad (6)$$

given an error probability $\epsilon$ and HD of d. A CRC checksum with a larger HD d is desirable, as $P_{ue}$ can be limited for longer content length n. If d is fixed, then the remaining degree of freedom is the desired σ, as the error rate $\epsilon$ is not generally known.

The above description of CRC error detection and its properties provides a framework for its applicability in enhancing content security as described herein. The interplay between content, error detection method, and resulting checksum lends itself to safeguarding content in unique ways while imparting the benefits of the error detection functionality.

With reference now to FIG. 1, an exemplary system 100 that facilitates enhancing security of digital content that is transmitted between computing systems is illustrated. The exemplary system 100 includes a transmitter computing system 102 that is in communication with a receiver computing system 104. The transmitter computing system 102 and the receiver computing system 104 may be or include any suitable type of computing system; thus, either or both of such computing systems 102 and 104 can be or include a desktop computing device, a laptop computing device, a mobile telephone, a wearable computing device, a server computing device (e.g., in a data center), a programmable logic controller (PLC), a network interface card (NIC), an application-specific integrated circuit (ASIC) sensor systems, a field programmable gate array (FPGA), etc.

The transmitter computing system 102 comprises computer-readable storage 106, wherein the computer-readable storage 106 stores digital content 108 that is to be transmitted from the transmitter computing system 102 to the receiver computing system 104. The digital content 108 can be or include any suitable type of data, including but not limited to textual data, compiled code, etc. With respect to the computer-readable storage 106, such storage 106 can be computer-readable memory, including read-only memory (ROM), random-access memory (RAM), or other suitable types of storage.

The transmitter computing system 102 additionally comprises obfuscation circuitry 110 that is configured to obfuscate the digital content 108 prior to the digital content 108 being transmitted from the transmitter computing system 102. In an exemplary embodiment, the obfuscation circuitry 110 can be or include a central processing unit (CPU), a microcontroller, a microprocessor, an ASIC, an FPGA, a NIC, or other suitable circuitry. The obfuscation circuitry 110 comprises an obfuscation protocol module 112. Various exemplary functionalities that can be performed by the obfuscation protocol module 112 will be described in detail below. In each of such examples, the obfuscation protocol module 112 includes a transmitter linear error correction code (LECC) generator module 114 that generates one or more LECCs with respect to the digital content 108 that is to be transmitted by the transmitter computing system 102 to the receiver computing system 104. As indicated previously, in an exemplary embodiment, the transmitter LECC generator module 114 can be configured to generate a CRC checksum based upon the digital content 108 retained in the computer-readable storage 106.

The obfuscation protocol module 112 employs an LECC output by the transmitter LECC generator module 114 to obfuscate the digital content 108 that is to be transmitted to the receiver computing system 104. More specifically, based upon an obfuscation protocol executed by the obfuscation protocol module 112, the obfuscation protocol module 112 obfuscates the digital content 108 to form obfuscated digital content 116 that is stored in the computer readable storage 106, wherein the obfuscated digital content 116 includes a first LECC 118 generated by the LECC generator module 114 based upon the digital content 108.

Optionally, the transmitter computing system 102 can include encryption circuitry 120 that is configured to encrypt the digital content 108 prior to the digital content 108 being obfuscated by the obfuscation circuitry 110. The encryption circuitry 120 can employ any suitable encryption scheme in connection with encrypting the digital content 108. Upon the encryption circuitry 120 (optionally) encrypting the digital content 108, and further upon the obfuscation protocol module 112 generating the obfuscated (encrypted) digital content 116, the transmitter computing system 102 can transmit the obfuscated (encrypted) digital content 116 to the receiver computing system 104.

The receiver computing system 104 is configured to receive the obfuscated digital content 116 transmitted thereto by the transmitter computing system 102. The receiver computing system 104 includes computer-readable storage 122, which can include a receiver buffer, wherein the obfuscated (encrypted) digital content 116 can be temporarily stored in the receive buffer.

The receiver computing system 104 additionally comprises deobfuscation circuitry 126 that is configured to reconstruct the digital content 108 based upon the obfuscated digital content 116. Similar to the obfuscation circuitry 110, the deobfuscation circuitry 126 can be a processor, a microcontroller, a NIC, an FPGA, an ASIC, or other suitable circuitry. When the obfuscated digital content 116 is encrypted, the deobfuscation circuitry 126 outputs the (encrypted) digital content 108. The receiver computing system 104 can optionally include decryption circuitry 124 that is configured to decrypt the (encrypted) digital content 108, such that the receiver computing system 104 can reconstruct the digital content 108.

The deobfuscation circuitry 126 comprises a deobfuscation protocol module 128, wherein the deobfuscation protocol module 128 is configured to perform a deobfuscation protocol with respect to the obfuscated digital content 116 received from the transmitter computing system 102. The deobfuscation protocol performed by the deobfuscation protocol module 128 is the inverse of the obfuscation protocol performed by the obfuscation protocol module 112 of the transmitter computing system 102. The output of the deobfuscation protocol module 128 is the digital content 108 with the first LECC 118 extracted therefrom. The deobfuscation circuitry 126 can further include a receiver LECC generator module 130 which is configured to generate a second LECC 132 based upon the digital content 108 output by the deobfuscation protocol module 128. The receiver LECC generator module 130 is additionally configured to compare the first LECC 118 with the second LECC 132; when the two LECCs 118 and 132 are equivalent, the receiver computing system 104 validates the integrity of the digital content 108 that has been recovered by the deobfuscation protocol module 128.

From the foregoing, it can be ascertained that the obfuscation protocol performed by the obfuscation protocol module 112 is a shared secret between the transmitter computing system 102 and the receiver computing system 104 (as the deobfuscation protocol performed by the deobfuscation protocol module 128 of the receiver computing system 104 is the inverse of the obfuscation protocol performed by the obfuscation protocol module 112 of the transmitter computing system 102). Because the obfuscation protocol is kept secret from entities other than the receiver computing system 104, a malicious entity may have difficulty recreating the digital content 108 from the obfuscated digital content 116. Instead, a computing system of a malicious entity that has intercepted a transmission from the transmitter computing system 102 to the receiver computing system 104 may be forced to spend a significant amount of computing resources to reconstruct the digital content 108. As noted previously, difficulty in recreating the digital content 108 can be furthered through use of the encryption circuitry 120.

It is to be understood that the transmitter computing system 102 and the receiver computing system 104 are not to be limited to data transmission between separate computing systems over a network. Rather, the technologies described herein are applicable to any form of computing node that sources data and any form of computing node that consumes the data. Accordingly, in an example, a computing node that sources data may be a processor while a computing node that consumes the data may be memory that is coupled to the processor. In another example, a computing node that sources data may be a first processor core on a chip while a computing node that consumes the data may be a second processor core on the chip. Hence, the transmitter computing system 102 and the receiver computing system 104 are to be interpreted broadly.

Exemplary operation of the transmitter computing system 102 and the receiver computing system 104 is now set forth. The transmitter computing system 102 is to transmit the digital content 108 to the receiver computing system 104. Optionally, the transmitter computing system 102 can employ the encryption circuitry 120 to encrypt the digital content 108, thereby forming encrypted digital content. The obfuscation circuitry 110 receives the (encrypted) digital content 108 from the computer readable storage 106, and the obfuscation protocol module 112 performs an obfuscation protocol with respect to the (encrypted) digital content 108. As part of such obfuscation protocol, the LECC generator module 114 generates the first LECC 118 based upon the (encrypted) digital content 108 and a generator function. More specifically, the first LECC 118 is incorporated into the (encrypted) digital content 108. As indicated previously, the first LECC 118 may be a CRC checksum. The obfuscated digital content 116 (which includes the first LECC 118) is then transmitted by the transmitter computing system 102 to the receiver computing system 104.

The receiver computing system 104 receives the obfuscated (potentially encrypted) digital content 116, whereupon the obfuscated (encrypted) digital content 116 with the first LECC 118 incorporated therein is stored in the computer readable storage 122 of the receiver computing system 104.

The deobfuscation protocol module 128 receives the obfuscated (encrypted) digital content 116 and performs the deobfuscation protocol with respect to the obfuscated (encrypted) digital content 116 to recreate the (encrypted) digital content 108 (with the first LECC separated therefrom). As described above, the deobfuscation protocol is the inverse of the obfuscation protocol performed by the obfuscation protocol module 112 of the transmitter computing system 102.

Upon the deobfuscation protocol module 128 outputting the (encrypted) digital content 108 and the first LECC 118, the receiver LECC generator module 130 generates the second LECC 132 based upon the (encrypted) digital content 108 and the same generator function employed to generate the first LECC 118. The receiver computing system 104 can then compare the first LECC 118 (extracted from the obfuscated (encrypted) digital content 116) with the second LECC 132 generated by the receiver LECC generator module 130. When the first LECC 118 and the second LECC 132 are equivalent, the receiver computing system 104 can verify integrity of the (encrypted) digital content 108. When the first LECC 118 and the second LECC 130 are different, the receiver computing system 104 can undertake some form of corrective action. When the digital content 108 has been encrypted, upon the receiver computing system 104 verifying the integrity of the encrypted digital content, the decryption circuitry 124 can decrypt the encrypted digital content, thereby outputting the digital content 108.

Advantages of the system 100 include use of the relatively ubiquitous LECC in connection with both obfuscating digital content and verifying integrity of the digital content. Obfuscation and deobfuscation of the digital content 108 is enabled by the obfuscation protocol being a shared secret between the transmitter computing system 102 and the receiver computing system 104. FIGS. 2-5 are schematics that illustrate exemplary obfuscation operations that can be performed by the obfuscation protocol module 112 and deobfuscation operations that can be performed by the deobfuscation protocol module 128. Operations described separately in FIGS. 2-5 can be combined in a suitable manner to further enhance security of the digital content 108 that is transmitted from the transmitter computing system 102 to the receiver computing system 104.

Figure 2:
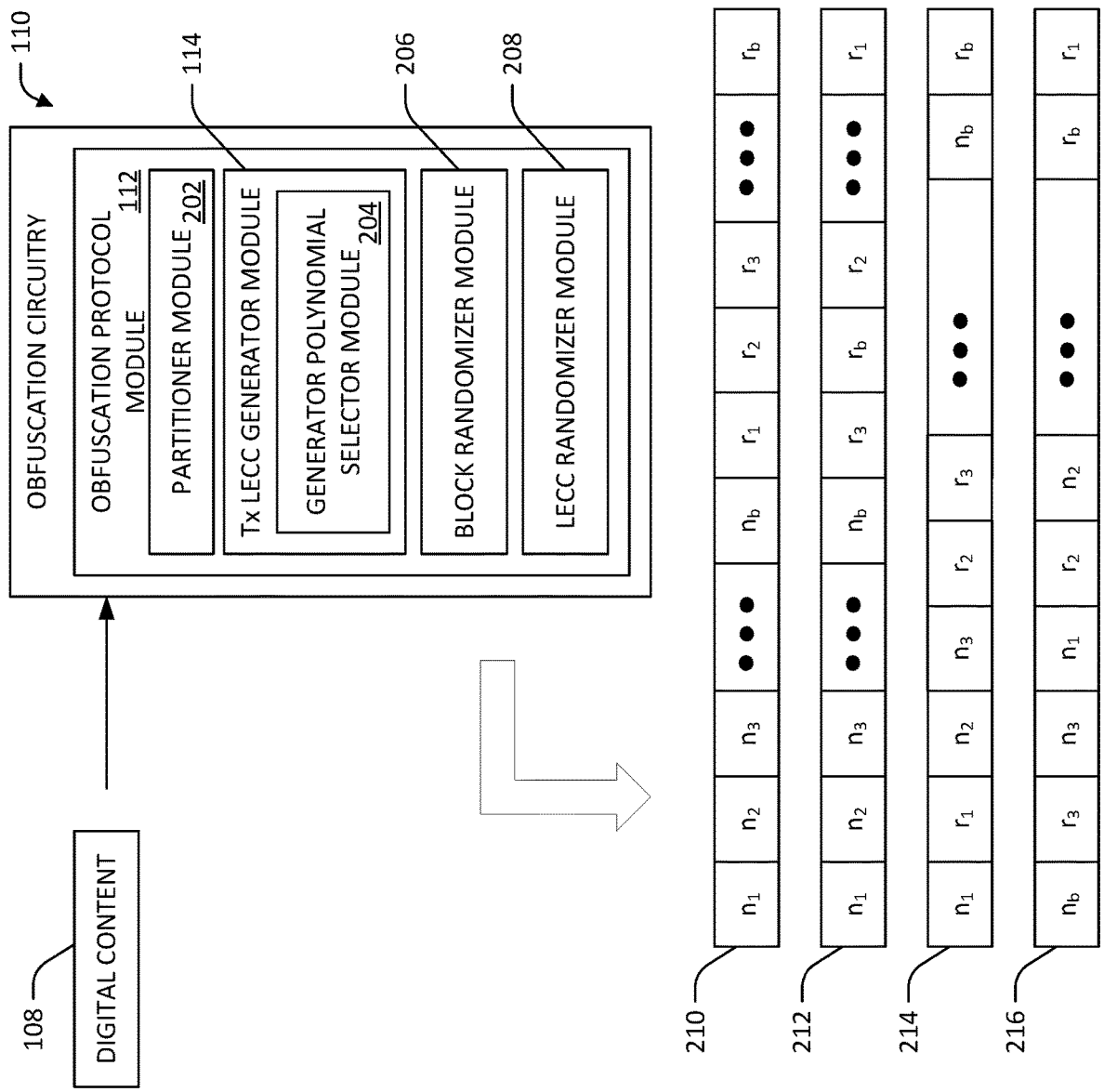
FIG. 2 is a functional block diagram of obfuscation circuitry that is configured to generate multiple LECCs for multiple blocks of digital content.

Referring now solely to FIG. 2, an exemplary schematic of the obfuscation circuitry 110 of the transmitter computing system 102 is illustrated. The obfuscation circuitry 110 comprises the obfuscation protocol module 112. The obfuscation circuitry 110 receives the digital content 108 and, as described previously, generates the obfuscated digital content 116 based upon the digital content 108 and a generator function. In the example depicted in FIG. 2, the obfuscation protocol module 112 includes a partitioner module 202 that is configured to partition the digital content 108 into several smaller blocks of digital content. In an example, each block of digital content output by the partitioner module 202 may be of the same length (e.g., the same number of bits). In another example, the blocks of digital content output by the partitioner module 202 may be of different lengths. For instance, lengths of the blocks of digital content output by the partitioner module 202 may be randomly chosen.

The transmitter LECC generator module 114 generates an LECC for each block of digital content output by the partitioner module 202. Thus, if the partitioner module 202 outputs M blocks of digital content, then the transmitter LECC generator module 114 generates M LECCs (one LECC for each block of digital content).

The transmitter LECC generator module 114 can optionally include a generator polynomial selector module 204. For a q-bit CRC there are $2^{q-2}$ possible generator polynomials as $a_0=1$ and $a_q=1$ are required. Randomly selecting a CRC generator polynomial, however, may not provide the desired error detection performance for a given content length. The generator polynomial selector module 204 can generate or select a generator polynomial with guaranteed error performance for a length of a block of digital content received by the generator polynomial selector module 204.

Previously, generator polynomials of the form $g(x)=(x+1)h(x)$ were introduced, where $h(x)$ is a primitive polynomial. These generator polynomials have a HD $d=4$ for content up to length $2^{q-1}-(q-1)$, where q is the order of the polynomial. This represents guaranteed error detection performance up to that content length. A 16 bit CRC using a primitive polynomial can detect up to three errors in $2^{15}-(15-1)=32,754$ bits while a 32 bit CRC can correct up to three errors for content length of 2,147,483,617 bits.

The search for primitive polynomials is a well-understood problem. Primitive polynomials are irreducible and have the additional property that a polynomial of degree q with binary coefficients is primitive with the smallest integer N, such that the polynomial that divides $x^N-1$ is equation $N=2^q-1$. The number of binary primitive polynomials for a given degree can be found from the following:

$$w_2(q) = \frac{\phi(2^q - 1)}{q}, \qquad (7)$$

where $\phi$ is the totient—or Euler phi—function. Since $2^q-1$ is a positive integer, it can be represented by its prime factors $\pi_1^{e_1}\pi_2^{e_2} \ldots \pi_t^{e_t}$. Accordingly, $$\phi(n)=(\pi_1^{e_1}-\pi_1^{e_1-1})(\pi_2^{e_2}-\pi_2^{e_2-1}) \ldots (\pi_t^{e_t}-\pi_t^{e_t-1}). \qquad (8)$$

Depending on the degree of the primitive polynomial and the resulting factors, the value of $\phi(n)$ can be fairly large and provide a rich set of CRC generator polynomials with the desired properties. For example, for a 16-bit CRC, a 15th order primitive polynomial is needed. Accordingly, $2^{15}-1=32,767$ is obtained, which can be factored as $7 \times 31 \times 151$. The number of primitive polynomials is therefore $$\frac{(7-1)(31-1)(151-1)}{15} = \frac{27000}{15} = 1800.$$

For a 32-bit CRC, the available number of primitive polynomials increases to 69,273,666.

Finding primitive polynomials of high order need not be a difficult task. It is not necessary to test all cases for all possible exponents $1 \le z \le 2^q-1$. Instead, a technique for finding primitive polynomials can be based on the following theorem.

Theorem 1

A binary polynomial $h(x)$ of degree q is primitive if and only if $x^{2^q} \mod(h(x))=x$, and for every prime integer $\eta$ dividing $2^q-1$, $x^{2^{q-1}/\eta} \mod(h(x)) \ne 1$.

These operations can be performed computationally efficiently.

Given a plurality of CRC generator polynomials, the partitioner module 202 and the transmitter LECC generator module 114 can operate on the digital content 108 in accordance with the following process: 1) the digital content 108, having K bits, can be provided to the partitioner module 202, where the partitioner module 202 breaks the digital content 108 into b blocks having $\{n_1, n_2, \ldots, n_b\}$ bits; 2) the generator polynomial selector module 204 can select a CRC generator polynomial from a plurality of generator polynomials $\{g_1, g_2, \ldots, g_m\}$, where m is the total number of available generator polynomials and the polynomials can be of any desired order $q_{low} \le q \le q_{high}$; and 3) the transmitter LECC generator module 114 receives a block $n_j$ of the digital content 108 output by the partitioner module 202 and obtains a generator polynomial $g_j$ selected by the generator polynomial selector module 204, and subsequently generates a CRC code $r_j$ based upon the block and the selected generator polynomial. The transmitter LECC generator module 114 can then append the resultant CRC checksum $r_j$ to the end of the block $n_j$, resulting in the codeword $c_j=[n_j,r_j]$ for the block of data $n_j$.

Hence, the transmitter LECC generator module 114 can output a stream of data that comprises codewords $\{c_1, c_2, \ldots, c_b\}$. While the above description is set forth in a general form, it is to be noted that there is no restriction upon the polynomials that can be employed by the transmitter LECC generator module 114 when generating LECCs. Generator polynomials of different orders can be used for any of the blocks of the digital content 108 to generate the LECCs.

Further, in the example set forth above, the LECCs generated by the transmitter LECC generator module 114 are appended to each portion or block of the data 108. As will be described in greater detail herein, the blocks of digital content and corresponding LECCs can be reordered in various different manners to further obfuscate the digital content 108.

The partitioner module 202 can be configured to set the number of bits in the content $\{n_1, n_2, \ldots, n_b\}$. Noting that for generator polynomials that comprise a primitive polynomial having a HD d=4 and for a given estimate of the error rate $\epsilon$ and setting the probability of undetected error $\sigma$ a priori, a constant number of bits $n_j$ can be arrived at for each section of the digital content 108. The selected generator polynomial can then be applied to the $n_j$ bits as described above.

The generator polynomial selector module 204 can select generator polynomials in a variety of different manners. For example, the generator polynomial selector module 204 can select generator polynomials based upon a pseudorandom number output by a random number generator, wherein the pseudorandom number is mapped to a generator polynomial in a lookup table that includes the plurality of generator polynomials. In another example, the plurality of generator polynomials can be implemented in a singly-linked, doubly-linked, multiply-linked, or circular-linked list, and the generator polynomial selector module 204 can receive an initial seed that maps to the start pointer of the list.

By randomly selecting generator polynomials for different blocks of the digital content 108 for use in connection with generating an LECC, an unauthorized entity seeking to reconstruct the digital content 108 from the obfuscated digital content 116 must search for those varying generator polynomials throughout the obfuscated digital content 116. Since the generator polynomial is unknown to an unauthorized entity, and the section lengths may vary, the location of any LECC in the obfuscated digital content 116 will be unknown to the unauthorized entity. The combination of these factors will force the unauthorized entity to apply LECC reverse engineering numerous times in an attempt to reconstruct the digital content 108 from the obfuscated digital content 116.

It is also noteworthy that for a section containing n bits with the LECC having k<n bits, it is possible that multiple generator polynomials can result in the same LECC. Therefore, even if an LECC reverse engineering approach can be employed to extract the block length and identify candidate generator polynomials, exact knowledge of the generator polynomial used to generate the LECC for a block of digital content from the plurality of generator polynomials is needed to extract the correct block from the obfuscated digital content 116. In other words, the unauthorized entity must choose which generator polynomial was actually used out of the many potential generator polynomials that produce the same LECC for the given number of bits.

From this stated approach, it can be concluded that higher order generator polynomials that comprise primitive polynomials can provide a large set of available polynomials with desired HD d=4. Still further, the generator polynomial selector module 204 can select polynomials with a higher number of nonzero coefficients for the plurality of polynomials due to the following benefits:

(1) Equally-likely bit errors are binomially distributed across the blocks of the digital content 108. Even if the error rate is relatively small, a large block of digital content can produce a small number of bit errors. Some of these errors may not be detected. Thus, using a larger number of nonzero coefficients, a higher number of errors of the required pattern are needed to cause an error detection failure of this type.

(2) It has been conjectured that polynomials that produce proper LECCs are those that have approximately q/2 non-zero coefficients, where q is the degree of the polynomial. This would require search of candidate polynomials on the order of $C_{(q-2)/2}^{q/2}$, where $C_x^y = y!/x!(y-x)!)$ is the binomial. For q=32, the search space becomes 145,422,675 candidates. Even if only 5% of the candidate polynomials satisfy the d=4 condition, there are potentially 7 million polynomials available. Of these, some percentage of them may be proper. Proper polynomials are desirable, as the bound of the probability of undetected error is now adjusted by the factor $2^{-q}$; that is, the value of the probability of undetected error $P_{ue}$ is now a decreasing function of the polynomial order. As noted previously, there is no mathematical approach defining proper polynomials and they must be tested for that property.

(3) By applying this constraint, the plurality of generator polynomials that can be generated or selected by the polynomial generator module 204 is reduced to ease storage requirements while also providing the largest variability thanks to the binomial. There are various approaches for storing the set of generator polynomials, some of which will be described in greater detail herein.

Another advantage of employing a plurality of generator polynomials in connection with generating the obfuscated digital content 116 is increased robustness against cyclostationary errors. Periodic interference may not correlate with quasi-stochastic polynomials used for the error detection process throughout the digital content 108. Utilizing numerous generator polynomials over different blocks of the digital content 108 provides some resilience in the presence of such interference. In a sense, distributing different LECCs (generated through use of different generator polynomials) throughout the digital content 108 to generate the obfuscated digital content 116 is similar to a form of spreading of the data, isolating different blocks of the content in relation to the respective generator polynomials used with respect to such content so that only specific blocks are impacted and not all of them. The content consumer (the receiver computing system 104) can then, as part of a corrective action, request only those blocks of data (and corresponding LECCs) from the transmitter computing system 102 to reprocess. This can lead to more efficient transmission and consumption of the digital content 108.

The obfuscation protocol module 112 can further optionally include a block randomizer module 206 and an LECC randomizer module 208. The block randomizer module 206 can randomize order of the blocks of the digital content 108 output by the partitioner module 202, such that in the obfuscated digital content 116 the blocks of data are not in linear order (e.g., the blocks of digital content are not in the same order in the obfuscated digital content 116 as they are in the digital content 108). The LECC randomizer module 208 can randomize order of LECCs that respectively correspond to the blocks of the digital content 108 output by the partitioner module 202, such that the order of the LECCs in the obfuscated digital content 116 is randomized. Examples of the obfuscated digital content 116 are depicted as reference numerals 210-216. In the obfuscated digital content 210, the LECCs $\{r_1, r_2, \ldots, r_b\}$ for the blocks of the digital content 108 $\{n_1, n_2, \ldots, n_b\}$ are appended to the blocks of the digital content 108 such that the LECCs follow the digital content 108 in the obfuscated data 116. In the obfuscated digital content 212, the order of the LECCs is randomized (e.g., the LECC randomizer module 208 has randomized order of the LECCs and appended the randomly ordered LECCs to the digital content 108). Thus, the LECC $r_3$ generated for the third block $n_3$ of the digital content 108 is positioned prior to the LECCs $r_1$ and $r_2$ generated for the first and second blocks $n_1$ and $n_2$ of the digital content 108, respectively.

In the obfuscated digital content 214, the blocks of the digital content 108 and the LECCs are placed in linear order; however, in some cases an LECC can follow a block of the digital content 108 upon which the LECC is not based. For example, in the obfuscated digital content 214, the LECC $r_2$ generated for the second block of the digital content 108 immediately follows the third block $n_3$ of the digital content 108 (rather than the second block $n_2$ of the digital content 108). Finally, in the obfuscated digital content 216, the block randomizer module 206 and the LECC randomizer module 208 have randomly positioned both the blocks of the digital content 108 and the LECCs generated based upon such blocks.

With more specificity pertaining to the partitioner module 202, the block randomizer module 206, and the LECC randomizer module 208, it is understood that error detection schemes use functions or algorithms to generate a checksum for the purpose of verifying the integrity of a block of digital content. If an error is introduced during transmission or storage, the checksum provides a high probability outcome to the prospect that an error was introduced into the digital content. In relation to the CRC error detection scheme described previously, the checksum is typically appended at the end of the data block. This is convenient because CRCs are implemented using linear feedback shift registers (LFSRs), and result in an all zero output at the end of operation on the full codeword $c_j=[n_j,n_j]$.

If an unauthorized user intended to extract digital content using reverse engineering of the CRC, knowing the location of the checksum would provide a pathway to facilitate the extraction of such content. The block randomizer module 206 and the LECC randomizer module 208 can be employed to distribute the blocks of data and the checksums of the blocks in a pseudorandom fashion, so that reverse engineering the content would require substantially more computing resources.

As indicated previously, in the obfuscated digital content 210, the checksums (LECCs) for each block are appended at the end of the content in the original bit sequence. In the obfuscated digital content 212, the checksums are placed at the end of the digital content 108, but order of the checksums is scrambled. In the obfuscated digital content 214, the checksums are ordered sequentially and then located anywhere amongst the blocks. In the obfuscated digital content 216, the checksums are generated, their order is scrambled, the order of the blocks is scrambled, and the blocks and checksums are scrambled together.

As noted previously, the obfuscation circuitry 110 can employ a protocol F, wherein such protocol F is a shared secret with the receiver computing system 104, such that the receiver computing system 104 can perform the inverse operation $F^{-1}$ to extract the checksums correctly and perform the error detection operation. For example, each checksum for each block must communicate the pair $[r_j, L_j]$, where $r_j$ is the jth checksum and $L_j$ is the location relative to the K bits of the content. These are captured in the following:

(1) For the example in which all of the checksums are appended at the end of the digital content 108 (e.g., the obfuscated digital content 210), $L_1=K+1$ and each subsequent length $L_i=L_{i-1}+L_{r_i}$ for i>1, where $L_{r_i}$ is the length of the checksum $r_i$ and $L_{i-1}$ is the length of all the previously appended checksums. This exemplar also applies to the checksums that are scrambled and then appended to the end of the digital content 108 (e.g., the obfuscated digital content 212).

(2) For the example where the location of a checksum can be anywhere amongst the blocks of the digital content 108 (e.g., the obfuscated digital content 214 or 216), the value of $L_j$ corresponds to anywhere within the K bits and the checksum $r_j$ is inserted at that location. The obfuscated digital content grows by the length of $r_j$, and the next location is $L_{j+1}>L_j$ plus the length of $r_j$.

In yet another exemplary embodiment, the partitioner module 202 can be configured to partition checksums into smaller sections and then such sections can be inserted into locations amongst the K bits of the digital content 108. In such an embodiment, the communication that must be shared between the transmitter computing system 102 and the receiver computing system 104 is a triple $[r_j,L_j,p_j]$, where $r_j$ is the checksum, $L_j$ is the initial location of the checksum, and $p_j$ is a vector consisting of a number of bits shifted relative to the value of $L_j$.

An exemplar of such an embodiment is now set forth. If it is assumed that a 32-bit CRC is used and checksum 1 uses the triple $[r_j,100, [0,16,4,8]]$, then the value of $L_j$ corresponds to the bit location 100 in the digital content 108. The length of $p_j=4$, and thus the checksum is split into bytes. The first location is 100+0, so the bits are shifted eight bits to the right and the byte of the checksum is inserted. The next location is 100+0+8+16=124 to account for the checksum byte that was inserted. At this location, the data can be shifted by 8 bits and the next checksum byte can be inserted. The next location is 100+0+8+16+8+4=136; this location can be selected and 8 bits can be shifted to the right to insert the third checksum byte. Finally, the last location is 100+0+8+16+8+4+8+8=152, so 8 bits can be shifted to the right and the final checksum byte can be inserted.

An exemplary process that can be performed by the obfuscation protocol module 112 is set forth below. First, the partitioner module 202 partitions the digital content 108 into several blocks, and the transmitter LECC generator module 114 generates checksums for each of the blocks, such that the digital content 108 is represented by codewords $c_j=[n_j, r_j]$ that have the blocks and checksums. Thereafter, the blocks and checksums are extracted from the codewords, and the blocks are provided to the block randomizer module 206 while the checksums are provided to the LECC randomizer module 208. The block randomizer module 206 reorders the blocks (based upon, for example, some seed input) and the LECC randomizer module 208 reorders the checksums (based upon, for example, some seed input). The obfuscation protocol module 112 combines the reordered blocks and checksums, with the locations of the blocks and checksums notated as described above.

Figure 3:
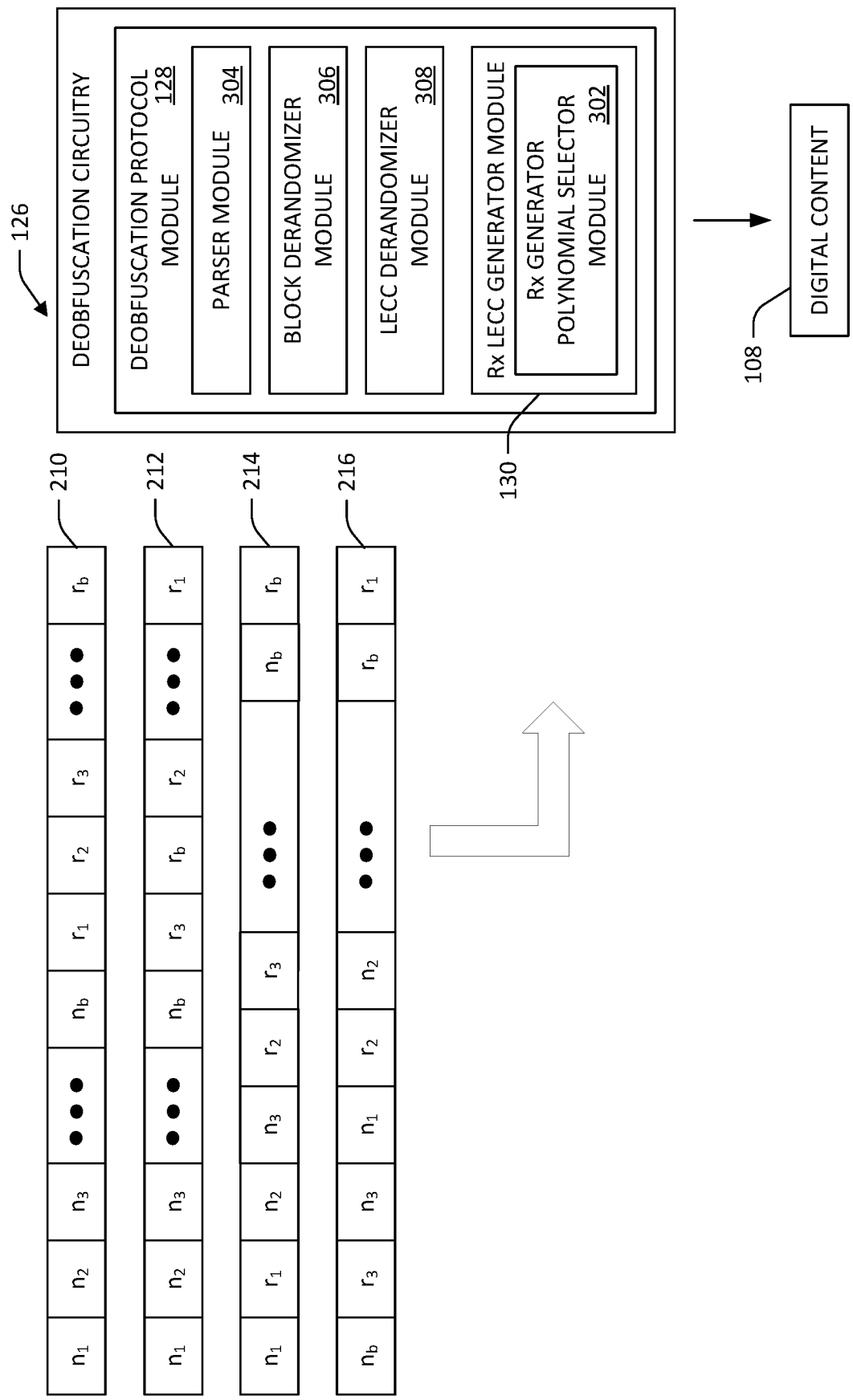
FIG. 3 is a functional block diagram of deobfuscation circuitry that is configured to reconstruct digital content from obfuscated digital content, wherein security of the digital content has been enhanced through use of LECCs.

With reference now to FIG. 3, a schematic of the deobfuscation circuitry 126 is presented. As indicated previously, the deobfuscation circuitry 126 performs the inverse operation that was performed by the obfuscation circuitry 112 in order to recover the digital content 108. The deobfuscation circuitry 126 includes the deobfuscation protocol module 128. In the example where different generator polynomials are employed to generate LECCs for blocks of digital content, the deobfuscation protocol module 128 includes the receiver LECC generator module 130, which comprises a receiver generator polynomial selector module 302. Additionally, the deobfuscation protocol module 128 comprises a parser module 304, wherein the parser module 304 is configured to extract codewords $c_j=[n_j, r_j]$ from the obfuscated digital content 116 (e.g., any of the obfuscated digital content 210-216). The receiver generator polynomial selector module 302 selects and uses the same generator polynomial $g_j$ that was used by the generator polynomial selector module 204 with respect to the block of digital content $n_j$ in a selected codeword $c_j$. The receiver LECC generator module 130 uses the $n_j$ bits and the generator polynomial $g_j$ to compute a checksum. The deobfuscation protocol module 128 can compare the computed checksum with the checksum included in the selected codeword $c_j$. If no error is detected, the block of digital content can be labeled as valid. If the checksums do not match, thereby indicating an error in the block of data, then no data is output and some corrective action can be performed.

The de-obfuscation protocol module 128 further optionally includes a block derandomizer module 306 and an LECC derandomizer module 308. The modules 306 and 308 perform the inverse operations as those described as being performed by the modules 206 and 208, respectively. The parser module 304 receives the obfuscated digital content 116 and extracts the block portions and the checksum portions from the obfuscated digital content 116 (based upon known locations of the block portions and the checksum portions in the obfuscated digital content 116). The block derandomizer module 306 reorders the block portions to recreate the order of such block portions in the digital content 108, and the LECC derandomizer module 308 reorders the checksums such that the reordered checksums correspond to the order of the block portions in the digital content 108.

The block derandomizer module 306 receives the blocks of digital content output by the parser module 304 and reorders the blocks into their original order $\{n_1, n_2, \ldots, n_b\}$. The LECC derandomizer module 308 receives the checksums output by the parser module 304 and reorders such checksums into the order that corresponds to the original order of the blocks of digital content $\{r_1, r_2, \ldots, r_b\}$. The deobfuscation protocol module 128 joins the blocks $n_j$ and checksums $r_j$ to obtain the original codewords $c_j=[n_j,r_j]$. The receiver LECC generator module 130 receives these codewords and processes them for error detection.

Continuing with the example set forth above with respect to the obfuscated 32-bit sequence from $[r_j,100, [0,16,4,8]]$, the first location is 100+0=100, so the parser module 304 can extract the first checksum byte from this location and the data can be shifted to the left by 8 bits. The next location is 100+0+16=116, which was location 124 in the original sequence, but the byte was already removed. The parser module 304 can extract the checksum byte, and the data can be shifted to the left by 8 bits. The next location is 100+0+16+4=120, so the parser module 304 can extract the third checksum byte and shift the data to the left by 8 bits. The last location is 100+0+16+4+8=128, and so the parser module 304 can extract the final checksum byte and shift the data by 8 bits. The result is the original block sequence $n_j$ and checksum sequence $r_j$ in the proper order so that the deobfuscation protocol module 128 can reconstruct the codewords $c_j=[n_j,r_j]$.

It is to be noted that the embodiments described with respect to FIGS. 2 and 3 are normative and not all-inclusive. Many variations of the examples are possible with corresponding increase in complexity. In such embodiments, a plurality of checksums can be deployed through content in varying locations so that any attempt to reverse engineer the content based on CRC would require exact knowledge of the checksum locations $L_p$ and, if applicable, the $p_j$ vector that identifies splits of the checksums. Any errors encountered in the reverse engineering process by an unauthorized entity without knowledge of the process would provide invalid data and the content would be treated as not useful.

It can also be noted that the forward and reverse operations require shared information. The shared information may itself be encrypted and use a CRC for error detection but is independent of the digital content 108. Due to the high-value nature of the shared information (the protocol shared between the transmitter computing system 102 and the receiver computing system 104), the shared information can also benefit from strong error correction with potential copies distributed throughout the content for redundancy (as this shared information is vital for proper extraction of the codewords for content processing).

Figure 4:
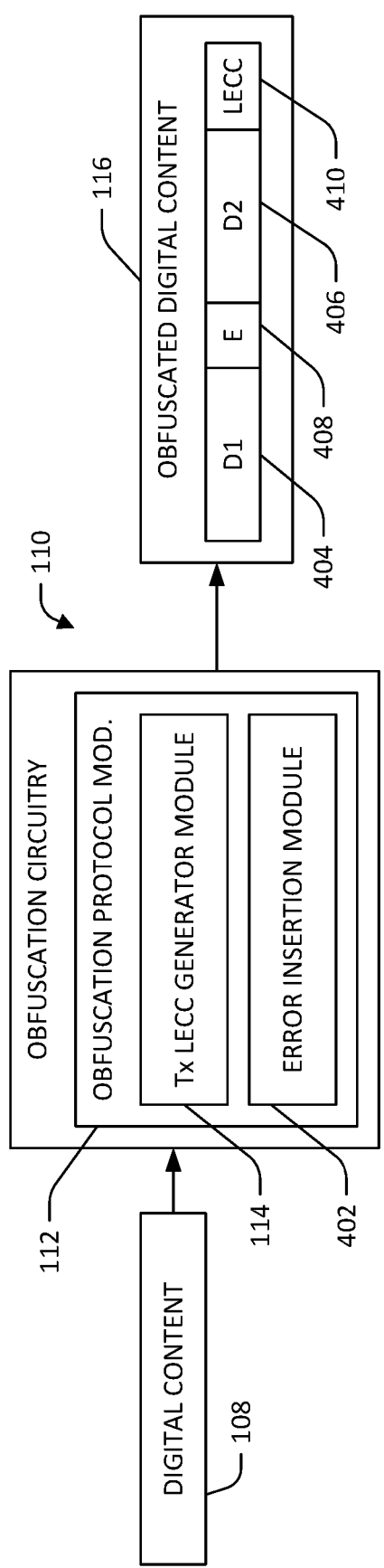
FIG. 4 is a schematic that illustrates obfuscation circuitry that is configured to enhance security of digital content by inserting extraneous data in the digital content and/or altering bits in the digital content.

FIG. 4 is a schematic of the obfuscation circuitry 110, where in an exemplary embodiment, the obfuscation circuitry 110 is configured to purposely include "artificial" errors in the digital content 108 that is be transmitted from the transmitter computing system 102 to the receiver computing system 104. As will be described below, in an example, the artificial errors do not impact the value of an LECC. Put differently, the transmitter LECC generator module 114 can output a first LECC based upon the digital content 108 and a generator polynomial, and can output a second LECC based upon the digital content 108 with the error(s) included therein and the generator polynomial, wherein the first LECC and the second LECC are equivalent. In such an embodiment, an unauthorized entity that acquires the obfuscated digital content 116 (with the artificial error(s) included therein) will compute the second LECC, determined that the second LECC is equivalent to the first LECC that is included with the obfuscated digital content 116, and verify the integrity of the obfuscated digital content 116 (even though the obfuscated digital content 116 includes an error that will render the data unusable by the unauthorized entity).

In such an example, the obfuscation circuitry 110 includes the obfuscation protocol module 112, which comprises the transmitter LECC generator module 114 and an error insertion module 402. The obfuscation circuitry 110 receives the digital content 108 and the error insertion module 402 identifies: 1) a generator polynomial to employ to generate an LECC for the digital content 108; and 2) an error and a location within the digital data 108 to include the error, such that the transmitter LECC generator module 114 will output the same LECC for the digital content 108 as it will with the digital content that includes the error.

In accordance with this example, then, the obfuscated digital content 116 may include several portions 404 and 406 (that are error-free) and "artificial" error 408 that is placed between the portions 404 and 406 by the error insertion module 402. The obfuscated digital content 116 further comprises a first LECC 410 that, in the example depicted in FIG. 4, is appended to the second portion 406 by the transmit LECC generator module 114.

Additional detail is now set forth with respect to inserting "artificial" errors into the digital content 108. An artificial error is an error that is introduced into the digital content 108, where the type and location of the error is shared between the transmitter computing system 102 and the receiver computing system 104. The artificial errors introduce additional variability in the digital content 108 to reduce the effectiveness of reverse engineering methods used to extract the digital content 108. In summary, then, an artificial error is an intentional error inserted into the digital content 108 that can be removed only by the authorized content consumer (e.g., the receiver computing system 104).

The most general approach to implementing artificial errors is to treat them as vector sequences that are either inserted into the digital content 108 as additional data or substituted in the digital content 108. For insertion, the errors are introduced into the digital content 108 by shifting the data to the desired location, inserting the error, and then continuing with the data. This process increases the content length by the length of the error vector. For artificial error substitution, bit reversal of the digital content 108 is performed at the location specified by the error vector. This does not increase the length of the digital content 108 but rather replaces bits in the locations by inversions of the bits. These errors can be of any length and even used in a burst error implementation.

Instead of using the checksum in the content, then, the error vector is used to obfuscate the digital content 108. Briefly, the digital content 108 is received by the error insertion module 402. The protocol information (that identifies location(s) of artificial errors) that must be shared between the transmitter computing system 102 and the receiver computing system 104 is represented by the vector $[e_j, L_j, p_j, o_j]$, where $e_j$ is the error vector, $L_j$ is a location of the artificial error along the content, $p_j$ is the vector consisting of the number of bits shifted relative to the value of $L_j$, and $o_j$ is a value denoting whether the error is an insertion artificial error (where additional data is added) or a substitution artificial error (where bits are flipped in the digital content 108). This approach is an extension of the technique used for the checksum described above.

The information from the vector is employed to perform the error insertion or substitution in the digital content 108. For error substitution, the bits corresponding to the locations of $L_j$ and $p_j$ are inverted. For error insertion, the bits corresponding to the locations of equation $L_j$ and $p_j$ are shifted to accommodate the portions of the artificial errors being inserted in a process identical to that described above.

Figure 5:
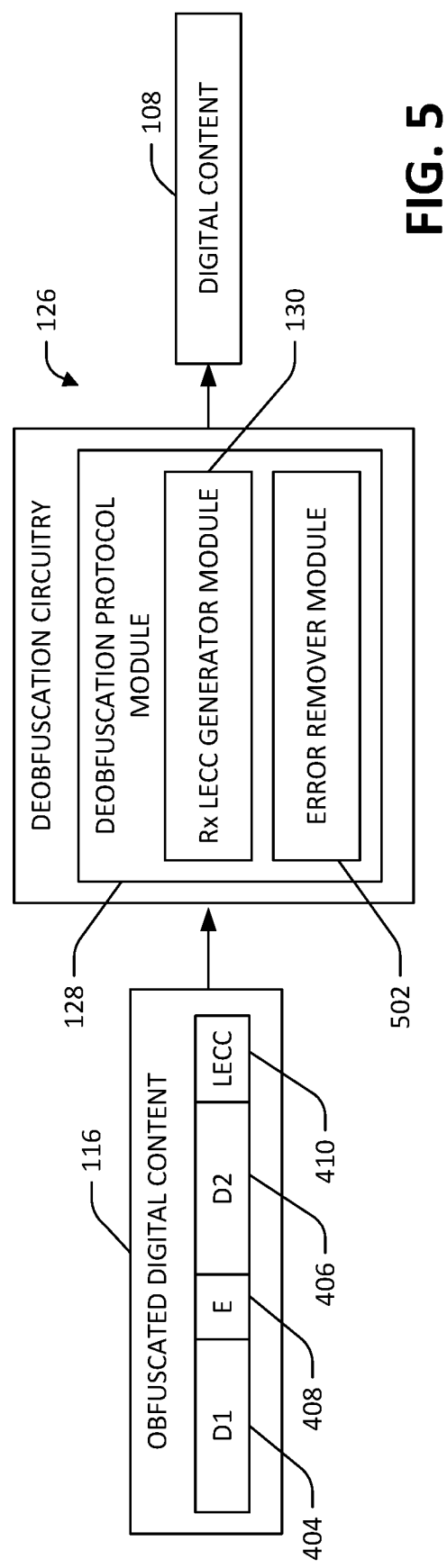
FIG. 5 is a schematic that illustrates deobfuscation circuitry that is configured to deobfuscate digital content by removing extraneous data that has been purposely placed in the digital content and/or undoing bit alterations in the obfuscated digital content.

Referring now to FIG. 5, a schematic depicting exemplary operation of the deobfuscation circuitry 126 is presented. The deobfuscation circuitry 126 receives the obfuscated data 116 output by the obfuscation circuitry 110. The deobfuscation protocol module 128 receives the obfuscated data 116. The deobfuscation protocol module 128 comprises an error remover module 502 that removes or corrects the artificial error 408 included in the obfuscated digital content 116. The receiver LECC generator module 130 can generate a second LECC (not shown) for the digital content 108 upon the error remover module 502 removing or correcting the artificial error 408, wherein the receiver LECC generator module 130 can employ the same generator polynomial used by the transmitter LECC generator module 114 to create the first LECC 410. The deobfuscation circuitry 126 can verify integrity of the digital content 108 based upon the first LECC 410 generated by the transmitter LECC generator module 114 and the second LECC generated by the receiver LECC generator module 130. Upon verifying the integrity of the digital content 108, the digital content 108 can be output to a process that consumes such content 108. Hence, the deobfuscation protocol module 128 performs an inverse of the operations performed by the obfuscation protocol module 112.

The approach described in FIGS. 4 and 5 is normative and not exhaustive; for example, it is possible to have error insertion and substitution occur on a per artificial error basis—that is, one artificial error can be an insertion error while the next artificial error may be a substitution error. The length of the artificial error(s) can be set a priori to be a bit, a nibble, a byte, or some other desired length. Such information is shared between the transmitter computing system 102 and the receiver computing system 104 (e.g., in a separate encrypted communication transmitted by the transmitter computing system 102 to the receiver computing system 104).

Ways in which the artificial errors are used with the purpose of producing different outcomes can be distinguished. In a first example, the artificial errors can be embedded in the digital content 108 after the content has initially undergone the CRC process; checksums generated through this approach result in "bad" outcomes, because the CRC checksum generated by the receiver computing system 104 will indicate an error in the digital content 108. The information that identifies location and length of errors in the obfuscated digital content 116, as indicated previously, can be shared through some encrypted communication between the transmitter computing system 102 and the receiver computing system 104. With this approach, an unauthorized entity may determine that the digital content 108 is not usable and therefore terminate the search for information.

In another example, the error 408 can be inserted into the digital content 108 prior to the CRC process being performed to generate the checksums. This approach generates "good" outcomes, because the CRC checksum generated by an unauthorized entity will not indicate an error if the content has not been modified. The information that can be used to extract the error can actually be part of the obfuscated digital content 116, as a CRC activity is performed to determine the state of the content. An unauthorized entity employing reverse engineering approaches will believe there is value in the content, but the error will actually be present. This is of particular interest, because an unauthorized entity may conclude that the reverse engineering process succeeded; however, the content is still corrupted by the artificial error.

A concept that exercises this type of artificial error is now described. It can be noted that for content length k>2, where q is the degree of the generator polynomial, then there will always exists at least two distinct contents with the same remainder. Hence, two input digital contents $T_1(x) \neq T_2(x)$ will produce the same remainder if the following holds:

$$T_1(x) \bmod (g(x)) = T_2(x) \bmod (g(x)). \quad (9)$$

when $T_2(x) = T_1(x) + e(x)$, where $e(x) = e_0 + e_1 x + \ldots e_p x^p$ is the error, the result is:

$$T_2(x) \bmod (g(x)) = (T_1(x) + e(x)) \bmod (g(x)) = T_1(x) \bmod (g(x)) + e(x) \bmod (g(x)) \quad (10)$$

since the modulo division is distributive.

Any error of the form $e(x) \bmod (g(x)) = 0$ forces the same outcome in the CRC error detection process. When the CRC occurs, the checksum indicates that there is no evidence of an error in the content. For the purposes of this description, this can be treated as an opportunity to force the probability of undetected error $P_{ue} = 1$. In other words, this type of artificial error can produce a "valid" checksum, but the obfuscated digital content 116 actually includes an error. This property of CRC turns a weakness of the CRC into a strength for the purpose of obfuscating data.

An exemplary implementation of this technique leverages the process of error substitution. In such implementation, the error vector becomes $[g_j, L_j, p_j, o_j]$, where $e_j = g_j$ corresponds to the condition $e(x) \bmod (g(x)) = 0$. The location $L_j$ and distribution $p_j$ are identical, and $o_j$ must be set for error substitution. The error vector is located at $z_i = L_j + p_i$, where $p_i$ is the ith entry of the vector $p_j$. The implicit requirement is that $|z_i| > |e_j|$, where $|\bullet|$ denotes the length of the bit sequence. This process provides bit shifts of the error $g_j$ through the jth content to force $P_{ue} = 1$.

As noted previously, the obfuscation techniques described herein can be combined in any suitable manner. For instance, artificial errors can be inserted into the digital content 108, and the digital content 108 can be partitioned with the order of the block locations and corresponding LECCs randomized. Further, the techniques described herein can be layered to perform quick evaluation of content tampering. For example, a final CRC can be used on the entire content or CRC checksums can be generated on selected blocks that have been processed in accordance with the technologies described herein. For example, data block codewords can be grouped (including their checksums) as $c_{new} = [c_1, c_2, \ldots, c_k]$ with $c_i = [n_i, r_i]$ processed in accordance with the technologies described herein. A new code word $[c_{new}, r_{new}]$ can be generated so that $r_{new}$ is the checksum resulting from the aggregated codewords. This additional layer may not offer much to enhance security, but it can alert the content consumer (the receiver computing system 104) to errors at the outer layer so that additional processing need not occur. Further, the layering approach can provide a scalable approach to applying greater content security enhancement in a predictable way.

In summary, then, the technologies described herein provide a systematic approach to implement a plurality of generator polynomials, a plurality of LECCs, and a plurality of errors to increase the difficulty of reverse engineering digital content while benefiting from the error detection process. In particular, the use of an error form that ensures a probability of an undetected error based in the plurality of generator polynomials presents an opportunity for safeguarding digital content against unauthorized exploitation.

Advantages of the technologies described herein are summarized below. First, the technologies can leverage CRC checksums, which are present in digital content for error detection. Second, hardware implementation of the CRC checksum process is simple and may be customized relative to system needs. Third, varying the LECC from data block to data block provides a form of content randomness that can circumvent cyclostationary errors that would otherwise corrupt a single fixed LECC. Fourth, varying CRC length from data block to data block provides some level of immunity against attacks where the attacker intercepts the content, modifies the content, and then sends the content to the intended recipient. Fifth, the combination of variable generator polynomials, including varying length, location, and distribution of LECCs and artificial errors in the content make it extremely difficult for known reverse engineering methods to extract useful content. Finally, the proposed technologies are independent of the content itself, meaning that the content can be encrypted, and the security further enhanced by the technologies described herein.

The technologies described herein have been described in the context of hampering reverse engineering of digital content; it is to be understood, however, that other applications are contemplated. For example, digital messaging between wired or wireless nodes in a network can apply the concepts to enhance security on a per packet basis. Other applications can include distribution of software packages or software code/modules. The implementation of choosing of random seeds for selecting the generator polynomials, checksums, and errors can be shared from a single point source or embedded in dedicated memory for selected components.

It is also to be noted that different LECCs can be employed when the technologies described herein are incorporated into a system. For example, a first type of LECC can be employed when LECCs (e.g., CRCs) are spread throughout the digital content 108 (e.g., as described with respect to FIGS. 2 and 3), while a second type of LECC (e.g., Hamming Codes) can be employed when artificial errors are inserted (e.g., as described with respect to FIGS. 4 and 5). In addition, bit framing can be employed in connection with technologies described herein, where position of a bit frame bit can be shared between the transmitter computing system 102 and the receiver computing system 104.

As noted several times above, the transmitter computing system 102 performs certain operations F on content to implement error correction with enhanced security while the receiver computing system 104 must perform the inverse operations to properly extract the digital content 108 and consume the data. To that end, the receiver computing system 104 must obtain a representation of those operations F in order to perform the inverse operations $F^{-1}$ in some compact way. There are various approaches that allow for the sharing of these operations such that the shared secret is established between the transmitter computing system 102 and the receiver computing system 104.

For instance, a frame synchronous scrambler (FSS) uses periodic initialization to an agreed state. FSSs are applicable to data transmissions where the initialization occurs at a time specified by the header or frame marker of the transmissions. FSSs provide quick and—depending on the header robustness—resilient synchronization. On the other hand, FSSs suffer from vulnerability to emulation attacks unless coupled with another randomization technique.

Distributed sample scramblers (DSSs) send samples of the scrambler state to the descrambler. While DSSs provide superior randomization compared to FSSs, additional time is required to acquire synchronization. In addition, there exists the potential for false synchronization if errors occur in the transmitted samples.

Self-synchronous scramblers (SSSs) convey the scrambler state within the scrambled data. SSSs exhibit advantages of simplicity, quick synchronization, and robustness against false synchronization as well as emulation attacks. Error multiplication, however, is a substantial weakness unless proper safeguards are taken.

In one exemplary embodiment, a code is generated from the pairs $[n_j, g_j]$ used in the block data content generation and provided to the receiver computing system 104. Here, $n_j$ denotes the length of the data bits in the jth section of the data, and $g_j$ is the generator polynomial used in that section. This information can be compressed, encrypted, and embedded in the digital content 108 in a location that is known to the receiver computing system 104 a priori and processed prior to the application of the technologies described herein. This approach can leverage an SSS and benefits from the fact that the receiver computing system 104 need not store all the generator polynomials; rather, the generator polynomials are provided in the shared information. A drawback is a potential increase in the overhead of the content due to the content pairs $[n_j, g_j]$ for each block.

In another exemplary embodiment, the number of bits $n_j$ can vary and the seed value D of a pseudorandom generator can be shared between the transmitter computing system 102 and the receiver computing system 104. In this case, the shared information is composed of a vector $[n_1, n_2, \ldots n_b,$ D]. This agreed state is used by the receiver computing system 104 to set the value D and its internal process to manage the list of generator polynomials, LECCs, and artificial errors. The main drawback of this technique is that the receiver computing system 104 must also store or have access to the list of polynomials and artificial errors and sequence them using the seed D.

In yet another embodiment, the number of bits $n_j-n$ is fixed and a seed value S is provided as a [n, S]. The seed value is the address of the initial generator polynomial and the address is then incremented to obtain the next generator polynomial in the list and to extract the next data block. This agreed state is shared between the transmitter computing system 102 and the receiver computing system 104. Due to the relatively small pair [n, S], it is possible to generate multiple copies of this vector and use an FSS to deploy the vector periodically through the content. This redundancy can be used at the receiver computing system 104 to assist in properly extracting the digital content 108. This embodiment has the disadvantage that the receiver computing system 104 must store or have access to the generator polynomials and error sources.

In summary, the operations performed by the transmitter computing system 102 to obfuscate the digital content 108 must be shared with the receiver computing system 104, such that the receiver computing system 104 can perform the reverse process required to extract and operate on the digital content 108. The sharing may be done via a source that is available to the transmitter computing system 102 and the receiver computing system 104 or via a dedicated platform that coordinates the interchange of the data.

Information related to exemplary approaches for storing generator polynomials is now set forth. It was previously noted that depending on the order of the generator polynomial, a set of millions of polynomials may be used to provide guaranteed error detection up to three errors at corresponding message lengths. A lookup table with millions of entries consisting of generator polynomials of 16 or more bits will require access to significant storage. While the storage of such data is not directly treated herein, the technologies described herein may require substantial storage resources. Exemplary approaches for storing generator polynomials and associated error forms are now set forth; such approaches, however, are applicable to other data sources as well.

In one exemplary embodiment, the required data can be stored using lossless compression in some memory location. Depending on the selected bit sequences, it may be possible to achieve good compression ratios. Using this approach, however, requires decompression of the data and allocating memory to the full table. If memory is limited, then it would be necessary to compress the data in sections that when decompressed fit into the available memory for processing.

In an exemplary process, bit vectors are broken into sections that have a size that is at or below a predefined threshold. The data is then compressed and stored in fixed memory. When a bit sequence is needed, the data is obtained from the memory and decompressed. The extracted data is then placed into usable memory and operated upon.

In another embodiment, the bit sequence can be treated as a binary matrix A of size u×v. In relation to the list of generator polynomials, u=m is the number polynomials and $v=q_{high}+1$ is the number of bits corresponding to the longest length bit vector. While this process is described here in relation to a list of generator polynomials, such process can be applied to any suitable binary data.

Binary matrix factorization can be used to reduce the required amount of storage. The idea behind matrix factorization is to take the u×v matrix A and factor as the product of two matrices U V, where U is u×w and V is w×v, with w<v, u being the ranked parameter. For a plurality of generator polynomials u=m<<v, by choosing an appropriate ranked parameter w<v, the required storage reduces to ≈uw instead of uv. One way to obtain a smaller size rank is to find all polynomials that share the same first common terms of length z>1 bits. These bits can be extracted from the common polynomials and stored independently. The resulting matrix A' is now of size m×($q_{high}$+1−z). The factorization can now be performed on the matrix A', obtaining corresponding matrices U' and V' of reduced order.

When the data is represented in this way, the generator polynomials can be constructed by way of the following process: 1) a selected polynomial value corresponds to an address in the list of generator polynomials and is mapped to that address; 2) the row of the matrix U is chosen based on the mapped value; 3) the column of the matrix V is chosen based on the mapped value; 4) the row of U and the column of V are multiplied together (binary multiplication of the row of U and the column of V is performed); and 5) common terms of the resulting vector are placed in front of the resting vector and output.

Aside from the reduced amount of storage required for generator polynomials, another advantage is that each generator polynomial is obtained on-the-fly. That is, a single vector is produced due to the mapping. In another embodiment, the matrix A'=U'·V' can be precomputed and the common first term appended to the front of each row to generate the full matrix A. The size of the matrix A must be able to fit in the allocated memory for processing. This approach requires computation in addition to memory storage.

In the case of storing generator polynomials, an embodiment is directed towards generator polynomials having the form g(x)=(x+1)h(x). In this case, the same approach can be taken where the matrix A comprises the list of the primitive polynomials h(x). To generate the full polynomial, the binary product (x+1)h(x)=g(x) must be implemented.

Efficient storage of generator polynomials and error vectors allows deployment of the technologies described herein with limited hardware impact. This capability must be made available to the transmitter computing system 102 but need not be implemented in the receiver computing system 104. The transmitter computing system 102 can receive the generator polynomial $g_j$ as part of the shared information used to compute the LECC for selected blocks. This increases the overhead of the content or the required bandwidth to obtain the needed information, but this approach removes the burden of the increased memory requirements to store the generator polynomials and error vectors at the receiver computing system 104.

Figure 6:
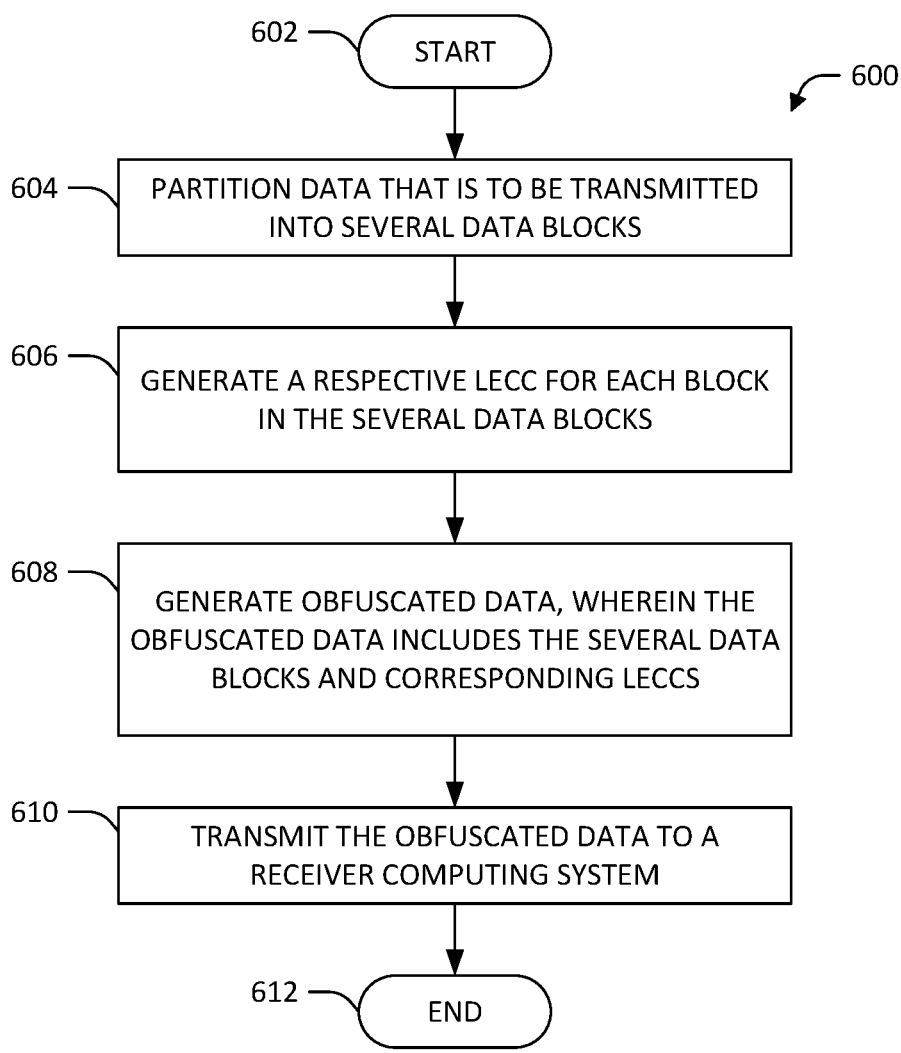
FIG. 6 is a flow diagram illustrating an exemplary methodology for generating obfuscated digital content, wherein the obfuscated digital content includes several data partitions (blocks) and corresponding LECCs.
Figure 7:
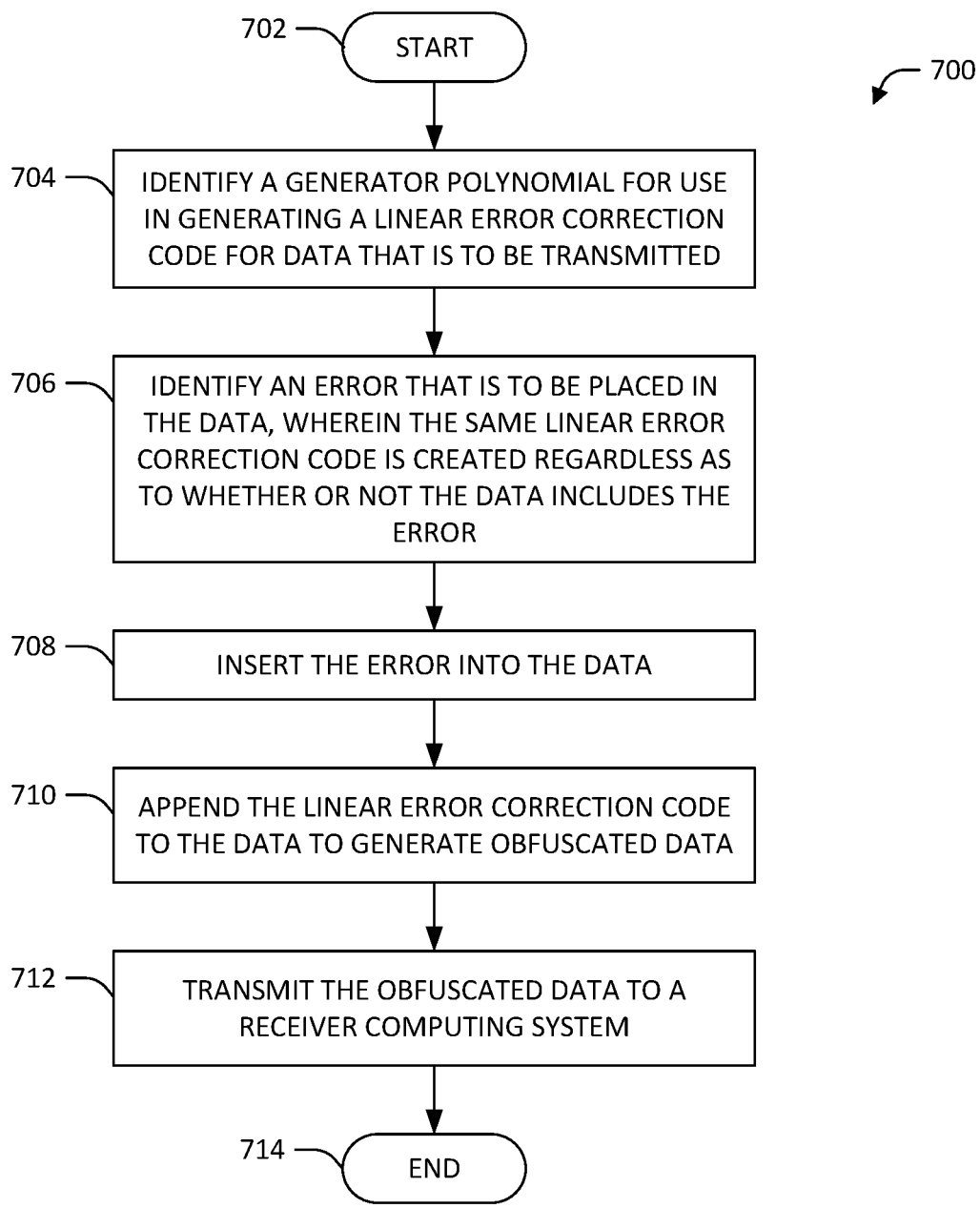
FIG. 7 is a flow diagram that illustrates an exemplary methodology for enhancing security of digital content by inserting extraneous data into the digital content and/or altering bits in the digital content.

FIGS. 6 and 7 illustrate exemplary methodologies relating to enhancing security of digital content. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Referring solely to FIG. 6, a flow diagram illustrating an exemplary methodology 600 for obfuscating digital content through use of LECCs is illustrated. The methodology 600 starts at 602, and at 604, data that is to be transmitted to a receiver computing system is partitioned into several data blocks. At 606, a respective LECC is generated for each data block in the several data blocks. In an example, different generator polynomials can be employed to generate the LECCs. At 608, obfuscated data is generated, wherein the obfuscated data includes the several data blocks and corresponding LECCs. For instance, the obfuscated data can be generated by randomizing positions of the data blocks and randomizing positions of the LECCs. At 610, the obfuscated data is transmitted to a receiver computing system, and the methodology 600 completes at 612.

Now referring to FIG. 7, a flow diagram illustrating another exemplary methodology 700 for enhancing security of digital content that is to be transmitted from a transmitter computing system to a receiver computing system is illustrated. The methodology 700 starts at 702, and at 704, a generator polynomial is identified for use in generating a LECC for digital content that is to be transmitted. At 706, an artificial error that is to be placed in the digital content is identified. In an example, if a same generator polynomial is used to generate a first LECC (for the digital content without the error included therein) and a second LECC (for the digital content with the error included therein), the first LECC and the second LECC will be identical.

At 708, the artificial error is inserted into the digital content, and at 710, the LECC is appended to the digital content to generate obfuscated data. At 712, the obfuscated data is transmitted to the receiver computing system. The methodology 700 completes at 714.

Figure 8:
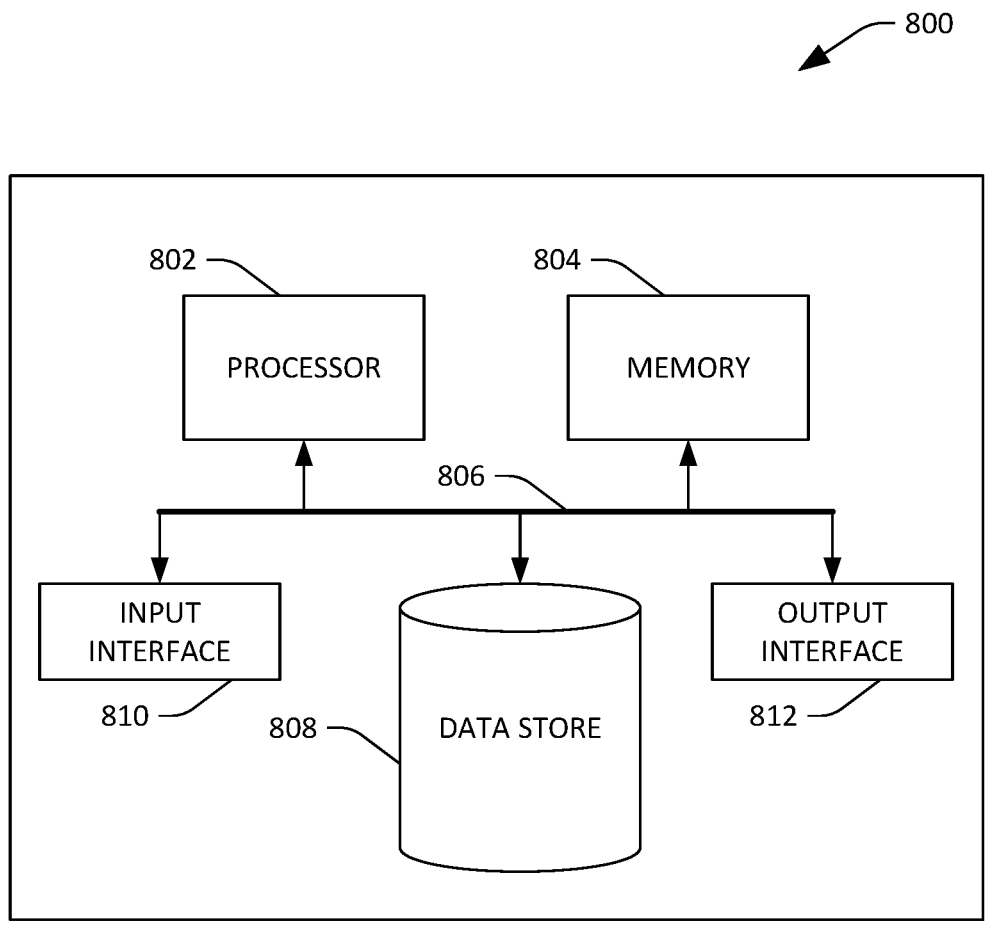
FIG. 8 is an exemplary computing system.

Referring now to FIG. 8, a high-level illustration of an exemplary computing device 800 that can be used in accordance with the systems and methodologies disclosed herein is illustrated. For instance, the computing device 800 may be used in a system that obfuscates digital content. By way of another example, the computing device 800 can be used in a system that deobfuscates digital content. The computing device 800 includes at least one processor 802 that executes instructions that are stored in a memory 804. The instructions may be, for instance, instructions for implementing functionality described as being carried out by one or more components discussed above or instructions for implementing one or more of the methods described above. The processor 802 may access the memory 804 by way of a system bus 806. In addition to storing executable instructions, the memory 804 may also store generator polynomials, digital content that is to be transmitted, obfuscated digital content, etc.

The computing device 800 additionally includes a data store 808 that is accessible by the processor 802 by way of the system bus 806. The data store 808 may include executable instructions, generator polynomials, a list of generator polynomials, etc. The computing device 800 also includes an input interface 810 that allows external devices to communicate with the computing device 800. For instance, the input interface 810 may be used to receive instructions from an external computer device, from a user, etc. The computing device 800 also includes an output interface 812 that interfaces the computing device 800 with one or more external devices. For example, the computing device 800 may display text, images, etc., by way of the output interface 812.

It is contemplated that the external devices that communicate with the computing device 800 via the input interface 810 and the output interface 812 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 800 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 800 may be a distributed system. Thus, for instance, several devices may be in communication by way of a network connection and may collectively perform tasks described as being performed by the computing device 800.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computing system that comprises processing circuitry, wherein the processing circuitry is configured to perform acts comprising:
   receiving digital content that is to be transmitted from the computing system to a receiver computing system;
   utilizing an obfuscation protocol with respect to the digital content to generate obfuscated digital content, wherein the obfuscation protocol is a shared secret between the computing system and the receiver computing system, and further wherein utilizing the obfuscation protocol with respect to the digital content to generate the obfuscated digital content comprises:
     partitioning the digital content into several blocks of data, wherein the several blocks of data include a first block of data and a second block of data;
     utilizing a first generator polynomial to generate a first LECC for the first block of data; and
     utilizing a second generator polynomial to generate a second LECC for the second block of data, wherein the obfuscated digital content comprises the first LECC and the second LECC; and
   transmitting the obfuscated digital content to the receiver computing system, wherein the receiver computing system is configured to reconstruct the digital content from the obfuscated digital content based upon the obfuscation protocol, and further wherein the receiver computing system is configured to ascertain that the first LECC and the second LECC that are included in the obfuscated data indicates that the digital content is free of errors.

2. The computing system of claim 1, wherein at least two blocks of data in the several blocks of data are of different lengths.

3. The computing system of claim 1, wherein utilizing the obfuscation protocol with respect to the digital content to generate the obfuscated digital content further comprises:
   positioning the first LECC immediately after the first block of data;
   positioning the second LECC immediately after the second block of data, wherein the first block of data is positioned prior to the second block of data in the obfuscated digital content.

4. The computing system of claim 1, wherein utilizing the obfuscation protocol with respect to the digital content to generate the obfuscated digital content further comprises:
   appending the first LECC and the second LECC to the digital content, wherein the obfuscated digital content comprises the digital content with the first LECC and the second LECC appended thereto.

5. The computing system of claim 1, wherein utilizing the obfuscation protocol with respect to the digital content to generate the obfuscated digital content further comprises:
randomly dispersing the first block of data, the first LECC, the second block of data, and the second LECC throughout the digital content.

6. The computing system of claim 1, wherein the processing circuitry is included in a network interface card.

7. The computing system of claim 1, wherein at least one of the first LECC or the second LECC is a cyclical redundancy check (CRC) checksum.

8. The computing system of claim 1, wherein utilizing the obfuscation protocol with respect to the digital content to generate the obfuscated digital content comprises:
identifying the first generator polynomial to utilize in the generator function to generate the first LECC;
identifying an error to insert into the digital content based upon the identified first generator polynomial, wherein a generator function, when utilizing the first generator polynomial, will output the first LECC when the generator function is provided with either the digital content or the digital content with the error inserted therein; and
inserting the identified error into the digital content, wherein the obfuscated digital content includes the digital content with the error inserted therein.

9. The computing system of claim 1, wherein the digital content is an encryption of content.

10. A method performed by a computing system that is transmitting digital content to a receiver computing system, the method comprising:
utilizing an obfuscation protocol with respect to the digital content to generate obfuscated digital content, wherein the obfuscation protocol is a shared secret between the computing system and the receiver computing system, wherein utilizing the obfuscation protocol with respect to the digital content to generate the obfuscated digital content comprises:
partitioning the digital content into several blocks of data, wherein the several blocks of data include a first block of data and a second block of data;
utilizing a first generator polynomial to generate a first LECC for the first block of data; and
utilizing a second generator polynomial to generate a second LECC for the second block of data, wherein the obfuscated digital content comprises the first LECC and the second LECC; and
transmitting the obfuscated digital content to the receiver computing system, wherein the receiver computing system is configured to reconstruct the digital content from the obfuscated digital content based upon the obfuscation protocol, and further wherein the receiver computing system is configured to ascertain that the first LECC and the second LECC that are included in the obfuscated data indicates that the digital content is free of errors.

11. The method of claim 10, wherein at least one of the first LECC or the second LECC is a cyclical redundancy check (CRC) checksum.

12. The method of claim 10, wherein the digital content is an encryption of content that is to be obtained by the receiver computing system.

13. The method of claim 10, further comprising inserting extraneous data into the digital content, wherein the generator function outputs at least one of the first LECC or the second LECC when provided with either the digital content or the digital content with the extraneous data inserted therein.

14. The method of claim 13, wherein the extraneous data is identified based upon at least one of the first generator polynomial or the second generator polynomial.

15. The method of claim 10, further comprising:
encrypting a portion of the obfuscation protocol; and
transmitting the encrypted portion of the obfuscation protocol to the receiver computing system.

16. The method of claim 15, wherein the encrypted portion of the obfuscation protocol is transmitted with the obfuscation digital content to the receiver computing system.

17. A transmitter computing device that comprises:
a processor that is programmed to perform operations comprising:
receiving digital content that is to be transmitted from the transmitter computing system to a receiver computing system; and
utilizing an obfuscation protocol with respect to the digital content to generate obfuscated data, wherein the obfuscation protocol is a shared secret between the computing system and the receiver computing system, wherein utilizing the obfuscation protocol with respect to the digital content to generate the obfuscated data comprises:
partitioning the digital content into several blocks of data, wherein the several blocks of data include a first block of data and a second block of data;
utilizing a first generator polynomial to generate a first LECC for the first block of data; and
utilizing a second generator polynomial to generate a second LECC for the second block of data, wherein the obfuscated digital content comprises the first LECC and the second LECC,
wherein the transmitter computing device transmits the obfuscated digital content to the receiver computing system, wherein the receiver computing system is configured to reconstruct the digital content from the obfuscated digital content based upon the obfuscation protocol, and further wherein the receiver computing system is configured to ascertain that the first LECC and the second LECC indicate that the first block of data and the second block of data are free of errors.

18. The transmitter computing device of claim 17, wherein at least one of the first LECC or the second LECC is a cyclical redundancy check (CRC) checksum.

19. The transmitter computing device of claim 17, wherein the first block of data and the second block of data are of different lengths.

20. The transmitter computing device of claim 17, wherein the digital content is an encryption of content that is to be obtained from the transmitter computing device by the receiver computing system.

* * * * *